No. 817,879. PATENTED APR. 17, 1906.
R. B. SHERIDAN.
RUNNING GEAR FOR VEHICLES.
APPLICATION FILED JULY 24, 1905.

2 SHEETS—SHEET 1.

Witnesses:

Inventor:
Richard B. Sheridan
By Cyrus Kehr
Atty

No. 817,879. PATENTED APR. 17, 1906.
R. B. SHERIDAN.
RUNNING GEAR FOR VEHICLES.
APPLICATION FILED JULY 24, 1905.

2 SHEETS—SHEET 2.

Witnesses:
James Buffat.
Carrie R. Ivy.

Inventor:
Richard B. Sheridan
By Cyrus Kehr
Atty.

UNITED STATES PATENT OFFICE.

RICHARD B. SHERIDAN, OF KNOXVILLE, TENNESSEE.

RUNNING-GEAR FOR VEHICLES.

No. 817,879.   Specification of Letters Patent.   Patented April 17, 1906.

Application filed July 24, 1905. Serial No. 270,916.

*To all whom it may concern:*

Be it known that I, RICHARD B. SHERIDAN, a citizen of the United States, residing at Knoxville, in the county of Knox and State of Tennessee, have invented a new and useful Improvement in Carriage and Wagon Running-Gear, of which the following is a specification, reference being had to the accompanying drawings.

My invention relates particularly to a fifth-wheel construction for carriages and wagons.

The object of the invention is to produce a neat, compact, and strong construction having as one of its characteristics the fifth-wheel axis located at one side of the adjacent axle in order that the wagon or carriage body may be swung laterally when the adjacent axle is turned for the changing of the course of the vehicle.

Figure 1:
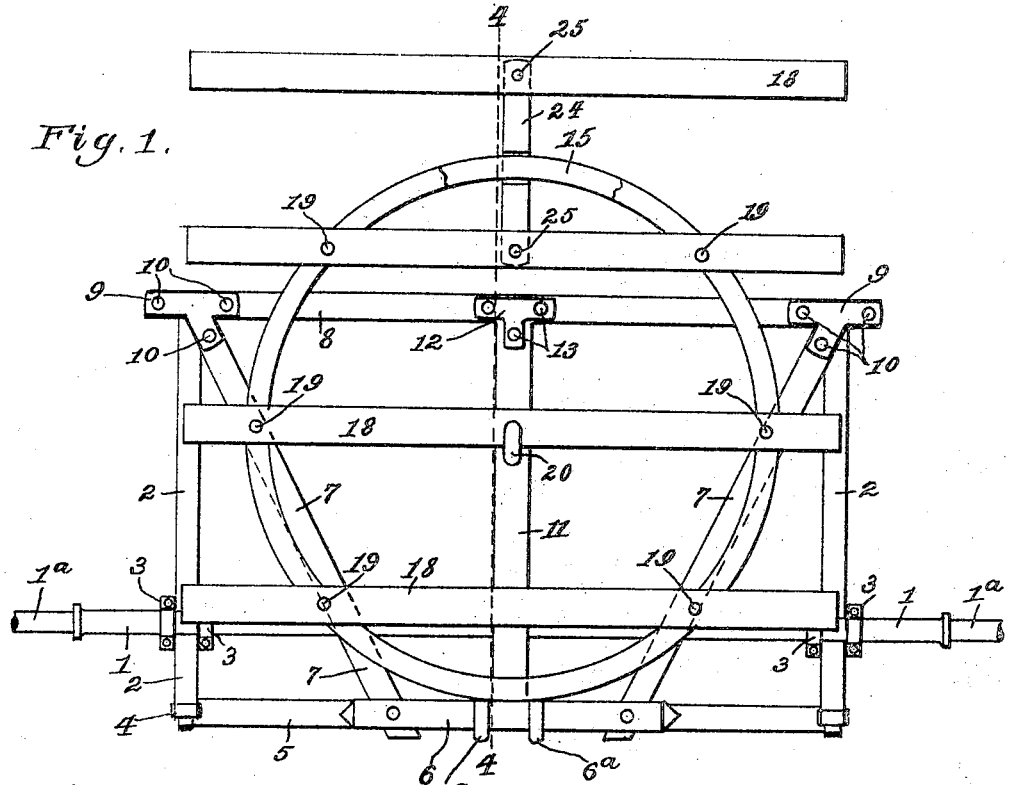
Figure 2:
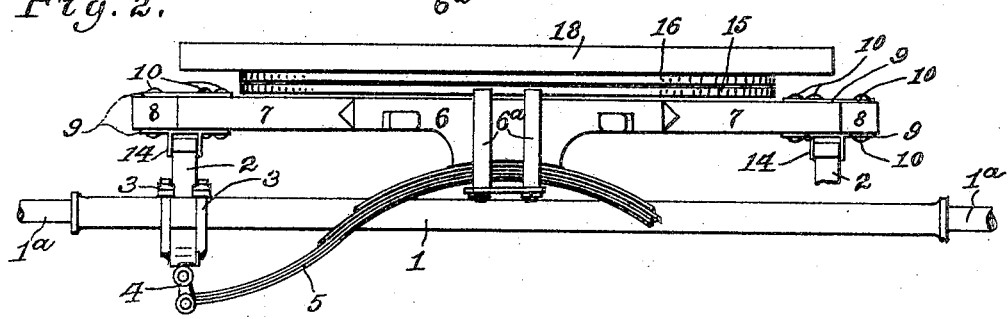
Figure 3:
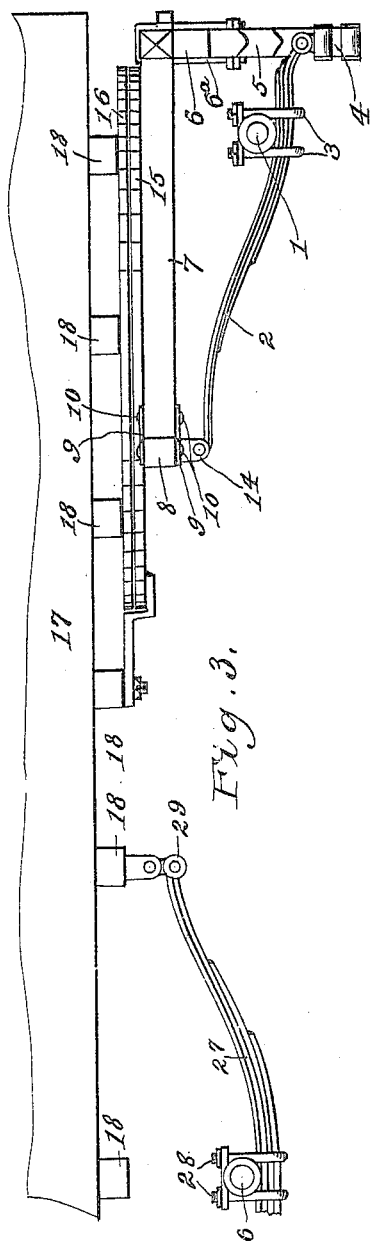
Figure 4:
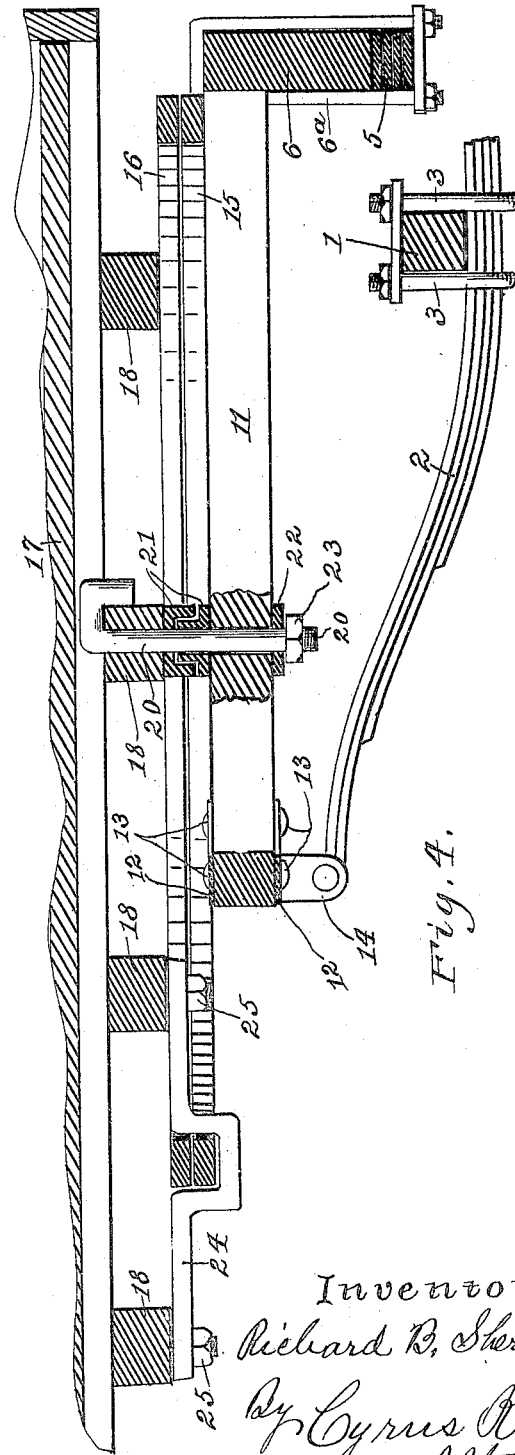

In the accompanying drawings, Figure 1 is a plan showing my improvement applied to a vehicle, the body of the vehicle having been removed. Fig. 2 is a front elevation of the structure shown in Fig. 1. Fig. 3 is a side elevation of a portion of the same vehicle. Fig. 4 is an enlarged section on the line 4 4 of Fig. 1.

Referring to said drawings, 1 is the front axle of an ordinary carriage or spring wagon. To this axle are clamped transversely two half-elliptical springs 2 by means of clamping-stirrups 3. Said springs are unsymmetrical, each having a short end extending forward and a relatively long end extending rearward. To the front end of each of said springs is applied a hanger 4, and from one of said hangers to the other extends a semi-elliptical spring 5, and upon the middle of said spring 5 is mounted a relatively short bolster 6, said spring and said bolster being secured to each other by clamps 6ª. From each end of said bolster a hound or bar 7 extends horizontally rearward and outward to a point above the rear end of the adjacent spring 2. The rear ends of said bars or hounds are joined by a horizontal bar 8, which is transverse to the length of the vehicle. Binding-plates 9 extend over the meeting ends of said hounds 7 and said bar 8 and are secured by bolts or rivets 10, extending through said plates and said hounds and said bar.

From midway between the ends of the hounds 7 a bar 11 extends horizontally rearward and is suitably joined by its rear end to the bar 8. To strengthen the union between said bars 11 and 8, binding-plates 12 are applied above and below said bars and secured thereto by bolts or rivets 13, extending through said plates and bars. From the lower plates 9 extend hangers 14, to which are secured the adjacent ends of the springs 2. Said bolster, hounds 7, bar 11, and bar 8 constitute a frame or platform upon which is mounted immovably the lower ring-form plate 15 of the fifth-wheel. The upper ring-form plate 16 of the fifth-wheel rests upon the lower plate 15. The axis of said plates is located rearward of the axle 1 a distance approximately equal to one-third the diameter of said plates. Obviously said distance may be varied; but to obtain the best results it should be approximately that shown by the drawings.

The upper ring 16 is suitably secured to the wagon or carriage body 17, (see Figs. 3 and 4,) and provision is made for permitting said ring to turn upon the ring 15 on the axis common to both rings without lateral movement. In the form shown by the drawings this is accomplished by applying cross-bars 18 to the bottom of the body 17 and securing the ring 16 to said bars by rivets or bolts 19 and extending a king-bolt 20 through the middle bar 18 and the bar 11, swivel-plates 21 being interposed between said bars and around said king-bolt and a reinforcing-plate 22 being applied to the lower face of said bar 11 around said king-bolt, and a nut 23 is applied to the lower end of said king-bolt.

The portions of the fifth-wheel frame and the lower fifth-wheel plate 15 which extend rearward should be supported against downward movement. This can be accomplished by means of a stirrup or yoke extending downward from the carriage-body 17 beneath said plate or ring 15 when the latter is in its normal position. In Figs. 1, 3, and 4 of the drawings 24 is such a stirrup or yoke extending beneath said plate or ring 15 and having its ends secured to the bars 18 of the carriage-body by means of upright bolts 25. Said stirrup is shown extending closely to the lower surface of said ring 15 and also closely to the lateral edges of said ring, so that said stirrup coöperates with the king-bolt 20 in preventing forward or rearward movement when the vehicle is drawn or backed. By an inspection of Fig. 1 it will be seen that enough of said ring 15 (which lies directly beneath the ring 16, shown by said figure) projects rearward of the bar 8 to allow ample range of movement of said ring 15 through said stirrup when the vehicle is being turned. The tongue or shaft connections are preferably made directly to the front axle 1 between the spindle 1ª and the clamps 3 by any desired form of coupling.

The mechanism above described constitutes the gear for the front wheels of the vehicle, and this gear is independent of the gear for the rear wheels, no reach being necessary. The rear gear may be in any desired form. Fig. 3 of the drawings shows a rear axle 26, a spring 27, secured transversely to said axle by means of clamps 28 and also joined to a hanger 29, extending downward from the body 17. Another spring 27 is similarly applied at the opposite side of the vehicle. When the tongue of the vehicle is turned toward one side of the vehicle, the fifth-wheel and the front end of the vehicle-body are moved laterally in the opposite direction, whereby more room is afforded for the front wheel which is being turned toward the middle line of the vehicle.

I claim as my invention—

In a vehicle, a vehicle-body having beneath it and secured thereto cross-bars, 18, a fifth-wheel frame located beneath said body, a fifth-wheel plate resting upon and secured to said frame, a second fifth-wheel plate resting upon the first-mentioned fifth-wheel plate and secured to said cross-bars, 18, a king-bolt joining said body and said frame in the axis of said plates, a stirrup located rearward of said king-bolt and extending beneath and along the upright faces of said plates and having its ends secured to two cross-bars, 18, springs located beneath and secured to said frame, and an axle applied to said springs forward of said king-bolt, substantially as described.

In testimony whereof I have signed my name, in presence of two witnesses, this 20th day of July, 1905.

RICHARD B. SHERIDAN.

Witnesses:
CYRUS KEHR,
M. O. FRENCH